Nov. 28, 1950 F. J. SINGER ET AL 2,532,125

SELECTIVE STATION RINGING SYSTEM

Filed Jan. 28, 1949

INVENTORS F. J. SINGER
L. J. STACY
BY
J W Schmied
ATTORNEY

Patented Nov. 28, 1950 2,532,125

UNITED STATES PATENT OFFICE 2,532,125

SELECTIVE STATION RINGING SYSTEM

Fred J. Singer, Rockville Centre, N. Y., and Leland J. Stacy, Chester, N. J., assignors to Bell Telephone Laboratories, Incorporated, New York, N. Y., a corporation of New York Application January 28, 1949, Serial No. 73,373

3 Claims. (Cl. 179—28)

This invention relates to selective signaling systems and more particularly to selective ringing systems for telephone party lines.

Telephone systems generally may provide for private ringing of as many as four separate parties on a common party line by various arrangements which are well known in the telephone art, but in such systems when it is desired to add more than four parties to a single line, as frequently is done in rural areas, semiselective or code ringing is generally required. Three arrangements for providing four-party full selective ringing are disclosed by Patent 1,778,768 granted to Norton on October 21, 1930, and certain improvements in such four-party full selective systems are disclosed by Patent 2,088,311 to Stacy, July 27, 1937. Numerous proposals have also been made for providing full selective ringing of more than four parties on a common line by means of differently tuned ringer sets at each subscriber station and a plurality of corresponding ringing frequencies at the central office. One such arrangement is disclosed by Patent 2,108,909 to Vincent, February 22, 1938. All such arrangements however have a number of disadvantages, not the least of which is the necessity for providing as many ringing signal generators at the central office as there may be parties on the line. This invariably leads to problems of supply, installation and maintenance, requiring a large number of marginally tuned ringers each different from the others, and a costly installation of a large number of different ringing generators at each central office. Another serious drawback to all such systems is that they require extensive modifications of both the central office apparatus and the party line subscriber stations such that the systems generally cannot be employed without installing completely new apparatus throughout.

One of the objects of the present invention is to provide a simple system for multiparty full selective ringing which can be adapted to existing telephone central offices by adding one or a few lines at a time without the necessity for interrupting service to other subscribers on semiselective or code ringing lines, or rewiring an entire central office for complete switchover to multiparty full selective ringing of all such lines at one time.

Another object of the invention is to provide an eight-party full selective telephone ringing system employing conventional 20-cycle ringing current.

Still another object is to provide a positive system of telephone party line subscriber station ringing without resort to the use of marginally adjusted or tuned ringers.

The manner in which the objects of the invention are achieved will be understood by an analysis of the following description taken in reference to the accompanying drawings in which.

Figure 2:
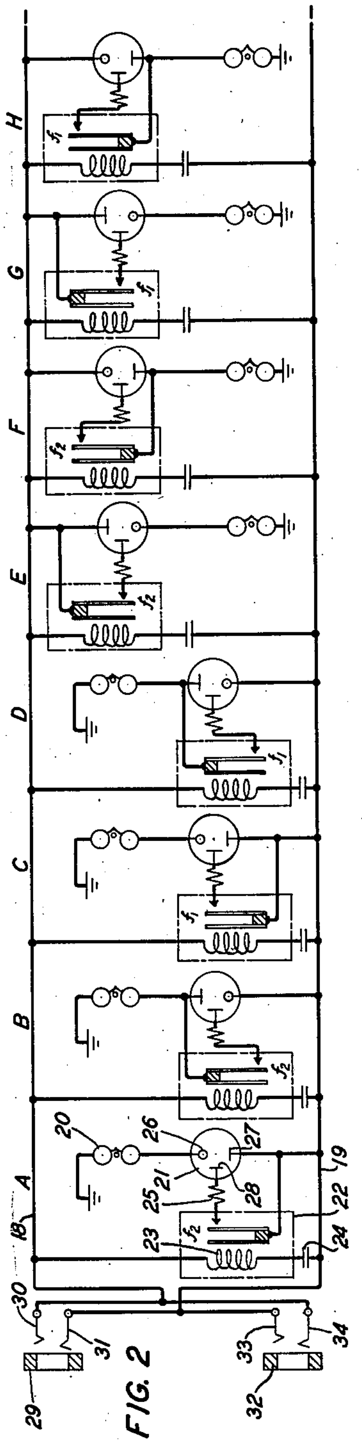
Fig. 2 shows an eight-party line, having substations A to H inclusive, equipped for fully selective ringing from the central office circuit of Fig. 1.

In the system of the present invention selective ringing is accomplished by employing a frequency selective reed relay of the general type disclosed in copending application of H. C. Harrison Serial No. 776,252 filed September 26, 1947, now abandoned having a vibrating reed contact, a three-element cold cathode trigger tube having a main discharge path of very high impedance before a starting discharge is initiated and of very low impedance for current of the correct polarity after the discharge is initiated by the vibrating reed contact, a coil and condenser in series across the line, and an electromagnetic 20-cycle ringer which is connected in series with the main gap of the three-element gas tube, the combination of these elements being connected between ground and either one or the other of the line conductors at each party station. In operation the selective reed relays respond to a particular signal frequency which may be selected in the voice frequency spectrum. For an eight-party line such as represented by Fig. 2, each tuned reed relay of a group of four is responsive to the same frequency. With this arrangement, a particular subscriber on the line may be selectively rung from the central office by sending out over either the tip or ring conductor 20-cycle alternating ringing current with superimposed positive or negative direct current and one of two selected voice frequency signal currents. Thus it will be apparent that whenever a particular subscriber is rung, four reed relays respond, but only one cold cathode tube breaks down and passes the rectified ringing current through the conventional station ringer.

In the description which follows it will be understood that transmission circuits and other features necessary for a complete telephone talking system, all of which are well known to the art, have been omitted from the present disclosure for the sake of simplicity in explaining the ringing operation. Also, for simplicity, a manually operated ringing system is shown rather than machine ringing or a dial system. It will be apparent to those skilled in the telephone art that the present party line selective ringing arrangement may be readily incorporated into conventional telephone systems employing either machine ringing or automatic dial switching.

Figure 1:
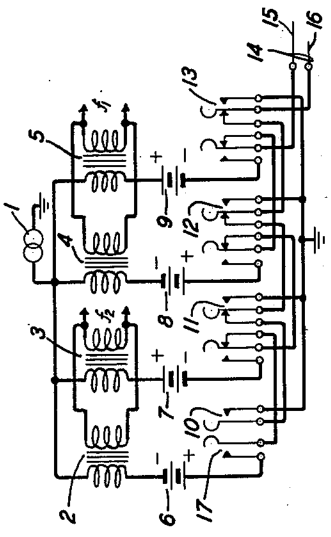
Fig. 1 represents the essential elements of a central office operator's cord circuit adapted for fully selective ringing of any one of eight parties on a single line.

Reference is now made to the details of Fig. 1 which shows a subvoice frequency generator 1 which may be a conventional 20-cycle ringing generator connected to one secondary terminal of each of four transformers 2, 3, 4 and 5. The primary windings of transformers 2 and 3 are connected in parallel to a source of voice frequency indicated as $f_2$, while the primaries of transformers 4 and 5 are connected in parallel to a source of voice frequency indicated as $f_1$. Details of these frequency sources $f_1$ and $f_2$ are here omitted, in the interest of simplification, since they may be any type of stable tone generators or oscillators of which many types are known to the art. In series with the secondary of transformers 3, 4 and 5 are connected direct-current sources from batteries 6, 7, 8 and 9 with alternate negative and positive polarities as indicated by the drawings. Ringing keys 10, 11, 12 and 13 are employed by the operator to select one out of four ringing conditions depending upon the party to be called. An operator's cord plug 14 having a tip connection 15 and a ring connection 16 is used by the operator to ring on either of the eight-party lines shown in Figs. 2 and 3 by plugging into one or the other of the jacks associated with each line.

Operation of the circuit of Fig. 1 will now be described with reference to the sequence of events when the operator closes key 10. Starting from ground at the 20-cycle ringing generator 1, a path is traced to the tip 15 of the plug 14 through the secondary of transformer 2, the superimposed positive battery 6, the make contact 17 of key 10, and the normally closed contacts of ringing keys 11, 12 and 13. In this circuit it is readily apparent that a ground will be connected to the ring conductor of plug 14 whenever any one of the four ringing keys 10, 11, 12 or 13 is operated. Thus when key 10 is operated there exists between the tip 15 and ring 16 of jack 14 an alternating 20-cycle current from the ringing generator 1, a superimposed voice frequency alternating current $f_2$ which is transferred from the primary to the secondary of transformer 2, and superimposed positive direct-current potential obtained from battery 6. If, however, instead of pressing key 10 the operator closes key 11, the only difference is the substitution of negative direct-current potential from battery 7. If key 12 is operated instead of either keys 10 or 11, it will be apparent that positive potential from battery 8 superimposed upon voice frequency alternating current $f_1$, through transformer 4, and 20-cycle ringing current from generator 1 will be applied to the tip of plug 14; and in similar manner if key 13 is operated, instead of keys 10, 11 or 12, a composite calling signal comprising negative direct-current potential from battery 9, voice frequency alternating current $f_1$ from transformer 5, and 20-cycle ringing current from generator 1 will be impressed upon tip 15 of the operator's plug 14. Thus, the various conditions which may obtain between tip 15 and ring 16 of plug 14 when any one of the four ringing keys are operated may be shown by a simple table as follows:

| Key | Positive Direct Current | Negative Direct Current | Alternating Current $f_1$ | Alternating Current $f_2$ | Ringing Current |
|---|---|---|---|---|---|
| 10 | X | | | X | X |
| 11 | | X | | X | X |
| 12 | X | | X | | X |
| 13 | | X | X | | X |

Referring now to Fig. 2 we will trace the operation required when any one of the eight-party line subscribers is rung by operation of the cord circuit of Fig. 1. In Fig. 2 it will be apparent that the subscribers' line comprises a tip conductor 18 and a ring conductor 19. It will also be observed that the subscriber's station A in Fig. 2 comprises a low frequency ringer 20, a three-element cold cathode tube 21, a voice frequency selective reed relay 22, a coil 23, a condenser 24 of low impedance to voice frequency current and high impedance to 20-cycle ringing current, and a current-limiting resistor 25. The remaining seven stations on the line, B through H, inclusive, comprise identical components with those in station A, the only difference in arrangement being that parties A to D inclusive have their ringers connected in series with the cold cathode tube from the ring conductor 19 to ground and are thus known as ring parties, whereas parties E to H inclusive have their ringers connected in series with the cold cathode tube from the tip conductor 18 to ground and thus are known as tip parties. This subscribers' party line appears in the central office on two jacks 29 and 32. As shown by the drawing the tip 30 of jack 29 is connected to line 18 and to the ring 34 of jack 32. The ring 31 of jack 29 is connected to line 19 and to the tip 33 of jack 32. When the operator desires to ring any one of the tip parties E to H inclusive, she inserts her plug 14 into jack 29, whereas to call any one of the ring parties A to D, inclusive, the operator must insert the plug 14 into jack 32.

Referring now to Figs. 1 and 2 jointly we will trace in detail the sequence of operation when the operator desires to ring party A. She inserts plug 14 into jack 32 and presses key 10 which connects ground to the line 18, and a composite of 20-cycle ringing current, voice frequency $f_2$, and superimposed positive direct-current battery to the line 19. The voice frequency $f_2$ on the line passes through condenser 24 and coil 23 to cause reed relay contact 22 to close. Closure of contact 22 connects the starter anode 28 of the cold cathode tube 21 in series with current limiting resistor 25 to the line 19. When the potential difference between the line 19 and ground is of sufficient magnitude due to the superimposed positive direct-current battery and the positive half cycle of the 20-cycle ringing current, a discharge will take place between the starter anode 28 and the cathode 26 thus ionizing the gas within the tube 21, allowing current to flow freely from the main anode 27 to ground through the low frequency ringer 20 which is thereby caused to operate. Current flows freely from the main anode to the cathode only when the main anode is positive with respect to the cathode. Because of this characteristic of the gas tube the ringer of station B does not respond at this time though a discharge does take place between the starter anode and the cathode at this station.

In Fig. 2 it will be observed that the connections for stations A and C are identical and thus the only distinction between these two stations is in the frequency of the vibrating reed relay provided for each station, the relay 22 in station A responds only to frequency $f_2$ whereas the corresponding reed relay in station C responds only to frequency $f_1$. In like manner the connections of subscriber stations B and D are identical with each other and are similar to stations A and C except that the connections to the main anode and cathode of the tubes at B and D are reversed with respect to the corresponding connections at stations A and C. Similarly, selectivity between stations B and D is obtained by having the tuned reed relay at station B responsive only to frequency $f_2$ whereas the corresponding reed relay at station D responds only to frequency $f_1$. From this circuit it is apparent that whenever stations A, B, C or D are rung, ground is placed on the tip conductor 18 of the subscribers' line thus preventing the tubes at stations E to H, inclusive, from firing.

Whenever the operator desires to ring any of the stations E to H, inclusive, she inserts her plug 14 into jack 29 and operates one of the keys 10, 11, 12 or 13 respectively thus placing ground on the ring conductor 19 and the composite calling signal of 20-cycle alternating current, superimposed direct-current potential and voice frequency on the tip conductor 18. In this case it will be obvious that the tip stations E to H, inclusive, will now function in the same manner as was explained above for the ring stations.

The correct selection of jack and key for ringing any one of the eighty-party line subscriber stations may be shown by a simple table as follows:

| Station | Jack | Key |
|---|---|---|
| A | 32 | 10 |
| B | 32 | 11 |
| C | 32 | 12 |
| D | 32 | 13 |
| E | 29 | 10 |
| F | 29 | 11 |
| G | 29 | 12 |
| H | 29 | 13 |

Figure 3:
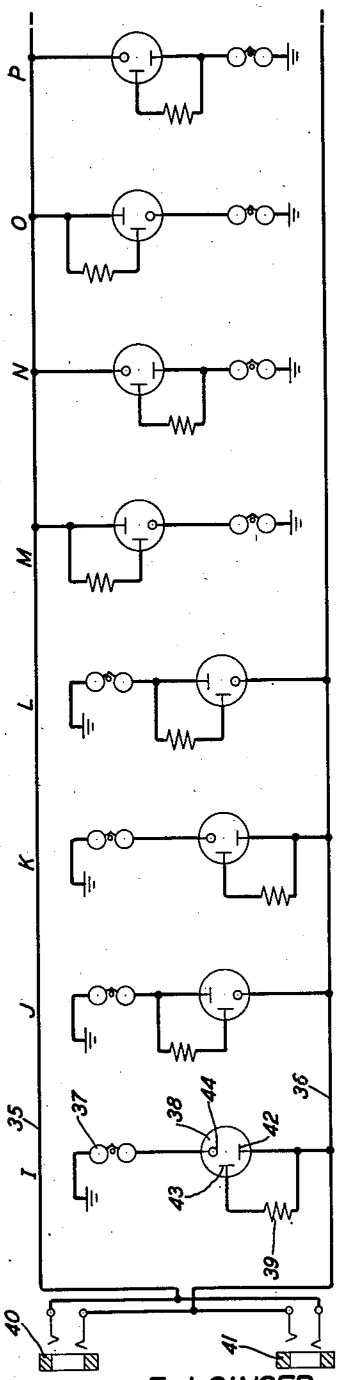
Fig. 3 shows another eight-party line of more conventional arrangement, having substations I to P, inclusive, equipped for semiselective or code ringing.

Referring now to Fig. 3 we see one form of a conventional eighty-party line equipped for semi-selective ringing, having substations I to P, inclusive. In Fig. 3, as in Fig. 2, only the substation elements necessary for ringing are shown, the talking apparatus at each station being omitted in the interest of simplicity. In Fig. 3 the subscribers' line comprises tip conductor 35 and ring conductor 36 which appears in the central office on two jacks 40 and 41 cross-connected in the same manner as jacks 29 and 32 of Fig. 2. Each of the eight-party stations I to P, inclusive, is equipped in the same manner as station I with a ringer 37, a three-element cold cathode tube 38 and a current limiting resistor 39. Parties I to L, inclusive, have their ringers connected in series with the cold cathode tubes from the ring conductor 36 to ground and thus are known as ring parties. Parties M to P, respectively, have their ringers connected in series with the cold cathode tubes from the tip conductor 35 to ground and thus are known as tip parties.

For the purpose of explaining how parties on this line are rung, we will assume that the operator desires to ring party I. She inserts her plug 14 in jack 41 and presses ringing key 10 in Fig. 1 which connects ground to the tip conductor 35 and at the same time applies 20-cycle alternating ringing current from generator 1, superimposed upon positive direct-current potential from battery 6, and the voice frequency signaling current $f_2$ from transformer 2, to the ring conductor 36. In this case since there is no device at the substation I to respond to the voice frequency current, this component of the composite calling signal does not serve any useful purpose in the operation of the circuit shown in Fig. 3. However, the 20-cycle ringing current superimposed upon the direct-current supply functions in the following manner. When the magnitude of potential difference between the starter anode 43 and the cathode 44 is sufficient, during a positive half cycle of the low frequency alternating-current ringing cycle, a discharge takes place between the starter anode and cathode which ionizes the gas within the tube 38. With the tube 38 ionized, current flows freely between the main anode 42 and cathode 44 to ground through the ringer 37 whenever the ring conductor 36 is positive due to the superimposed direct-current potential and the positive half cycle of the 20-cycle ringing current. As previously explained in reference to Fig. 2, the cold cathode tubes in these circuits pass current freely in only one direction. Since tip stations I and K in Fig. 3 are identically wired, both ringers will respond and it will therefore be necessary for the operator to introduce a code signal with her ringing key so that the desired station may be signaled. The code commonly used for this purpose is one ring for one party and two rings for the other party, in accordance with a prearranged designation. We may assume for the purpose of this explanation that the parties I, K, M and O are to be signaled by one ring and that parties J, L, N and P are to be signaled by two rings. With this arrangement the operator will plug into jack 41 and manipulate ringing key 10 of Fig. 1 so as to give one ring for the desired call to party I.

It will be obvious that the substations of the tip parties M to P, inclusive, operate in the same manner as the ring parties I to L whenever the operator desires to ring one of them by plugging into jack 40. Thus the combination of ringing key, jack and code rings which may be used by the operator to call any one of these eight parties I to P, inclusive, of Fig. 3 may be expressed in tabular form as follows:

| Party | Ringing Key | Jack | Number of Rings |
|---|---|---|---|
| I | 10 | 41 | 1 |
| J | 11 | 41 | 2 |
| K | 12 | 41 | 1 |
| L | 13 | 41 | 2 |
| M | 10 | 40 | 1 |
| N | 11 | 40 | 2 |
| O | 12 | 40 | 1 |
| P | 13 | 40 | 2 |

The arrangement disclosed by Figs. 1, 2 and 3 in which the subscribers' lines each appear on two jacks in the central office may be modified by presenting the lines each on only one jack and providing a total of eight ringing keys in lieu of the four keys shown in Fig. 1, without departing from the spirit or principle of the invention. The invention may be employed in central office telephone systems having any other form of multiparty semiselective circuits and is not limited only to such offices connected with party lines having the specific arrangement of Fig. 3, but the invention may be employed in any telephone system wherein it is desired to add lines adapted for full selective ringing of any one of a plurality of parties in the manner herein disclosed without interrupting or discontinuing service to other party lines equipped only for semiselective ringing.

What is claimed is:

1. In a selective ringing system a line having tip and ring conductors to which conductors are connected a plurality of substations arranged in groups of four, of which all members of a group are possibly but not necessarily present, a tuned relay and condenser in series bridged across the line at each station, each relay of a group of four being tuned to a common frequency, relays of each successive group of four being tuned to different frequencies common to each group, a ringer and ground connection at each station, a multielectrode gas discharge tube at each station, means at each station connecting a control anode of said tube to a contact of said tuned relay, further means at each station connecting a main anode of said tube to an armature of said relay, a first station of each group having the main anode of its gas tube connected to the tip conductor of said line and the cathode of said tube connected through said ringer to ground, a second station of each group having the cathode of its gas tube connected to said tip conductor and the main anode of said tube connected through said ringer to ground, a third station of each group having the main anode of its gas tube connected to the ring conductor of said line and the cathode of said tube connected through said ringer to ground, and a fourth station of each group having the cathode of its gas tube connected to the ring conductor of said line and the main anode of said tube connected through said ringer to ground.

2. In a selective ringing system, a line having tip and ring conductors, a plurality of stations divided into two groups, each station comprising a tuned relay, a condenser having a low impedance-to-voice frequency current and a high impedance-to-subvoice frequency current, a three-electrode gas-filled tube, and a ringer, the winding of the relay and the condenser at each of said stations being connected in series across the conductors of said line, the relay at each of certain of said stations in each group being tuned to a first voice frequency and the relay at each of the others of said stations in each group being tuned to a second voice frequency, one terminal of the ringer at each station being connected to ground potential, means connecting the other terminal of the ringer at one of said certain stations in one group to the anode of the tube thereat and further means connecting the cathode of said tube to the tip conductor of said line, means connecting the other terminal of the ringer at another of said certain stations in said one group to the cathode of the tube thereat and further means connecting the anode of said tube to the tip conductor of said line, means connecting the other terminal of the ringer at one of said other stations in the first group to the anode of the tube thereat and further means connecting the cathode of said tube to the tip conductor of said line, means connecting the other terminal of the ringer at another of said other stations in the first group to the cathode of the tube thereat and further means connecting the anode of said tube to the tip conductor of said line, like connecting means for connecting the ringers and main electrodes of the tubes of stations in the other group to the ring conductor of the line, and means at each of said stations comprising contacts closed by the energization of the tuned relay thereat for interconnecting the anode and control electrodes of the gas-filled tube thereat to effect energization of the tube and ringer thereat.

3. In combination a line having a pair of conductors, a pair of substations connected to said line, each substation comprising an indicator, a tuned reed relay, a condenser and a multielement gas-filled tube having a cathode, an anode, and a control electrode, the winding of the relay and the condenser at each of said stations being connected in series across the conductors of said line, the armature contacts of the relay at each of said stations being connected across the anode and control electrode of the tube thereat, means at one of said stations connecting the anode of the tube thereat to one side of said line and the cathode of said tube through the indicator thereat to ground, and means at the other of said stations connecting the cathode of the tube thereat to the corresponding side of said line and the anode of said tube through the indicator thereat to ground.

FRED J. SINGER.
LELAND J. STACY.

REFERENCES CITED

The following references are of record in the file of this patent:

UNITED STATES PATENTS

| Number | Name | Date |
|---|---|---|
| 922,436 | Manson | May 18, 1909 |
| 937,399 | Weman | Oct. 19, 1909 |
| 953,082 | Winslow | Mar. 29, 1910 |
| 1,070,726 | Poole | Aug. 19, 1913 |
| 1,520,097 | Thompson | Dec. 23, 1924 |
| 2,064,319 | Pruden | Dec. 15, 1936 |
| 2,077,947 | Lubberger | Apr. 20, 1937 |